United States Patent
Singleton et al.

(10) Patent No.: US 8,947,834 B2
(45) Date of Patent: Feb. 3, 2015

(54) METHOD AND APPARATUS FOR CHEMICAL-MECHANICAL POLISHING

(71) Applicant: Seagate Technology LLC, Cupertino, CA (US)

(72) Inventors: Eric Walter Singleton, Maple Plain, MN (US); Shaun Eric McKinlay, Eden Prairie, MN (US); Stacey Christine Wakeham, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/797,381

(22) Filed: Mar. 12, 2013

(65) Prior Publication Data

US 2014/0272472 A1 Sep. 18, 2014

(51) Int. Cl.
*G11B 5/17* (2006.01)
(52) U.S. Cl.
USPC .......................................................... 360/313
(58) Field of Classification Search
USPC .......................................................... 360/313
See application file for complete search history.

(56) References Cited

U.S. PATENT DOCUMENTS

| | | | | |
|---|---|---|---|---|
| 7,340,824 B2 * | 3/2008 | Feldbaum et al. | ......... | 29/603.16 |
| 7,522,391 B2 * | 4/2009 | Freitag et al. | ............ | 360/324.12 |
| 7,587,810 B2 * | 9/2009 | Le | ............... | 29/603.15 |
| 7,663,846 B2 * | 2/2010 | Freitag et al. | ............ | 360/324.11 |
| 7,765,676 B2 * | 8/2010 | Cyrille et al. | .............. | 29/603.12 |
| 7,788,798 B2 * | 9/2010 | Guthrie et al. | ............. | 29/603.16 |
| 7,950,137 B2 * | 5/2011 | Bonhote et al. | ............ | 29/603.16 |
| 8,011,084 B2 * | 9/2011 | Le et al. | ...................... | 29/603.16 |
| 8,066,893 B2 * | 11/2011 | Baer et al. | ....................... | 216/22 |
| 8,230,583 B2 * | 7/2012 | Lille | .......................... | 29/603.16 |
| 8,268,407 B2 * | 9/2012 | Jiang et al. | .................... | 427/551 |
| 8,347,489 B2 * | 1/2013 | Hong et al. | ................ | 29/603.16 |
| 8,441,757 B2 * | 5/2013 | Chen et al. | ............... | 360/125.13 |
| 8,614,864 B1 * | 12/2013 | Hong et al. | ............... | 360/324.12 |
| 8,634,162 B2 * | 1/2014 | Bonhote et al. | .......... | 360/125.02 |

* cited by examiner

*Primary Examiner* — Mark Blouin
(74) *Attorney, Agent, or Firm* — HolzerIPLaw, PC (57) ABSTRACT

In accordance with certain embodiments, a method can be utilized that includes depositing a backfill material layer over a reader stack; depositing a chemical-mechanical-polishing stop layer above the layer of backfill material; and depositing a sacrificial layer on top of the chemical-mechanical-polishing stop layer.

20 Claims, 8 Drawing Sheets

METHOD AND APPARATUS FOR CHEMICAL-MECHANICAL POLISHING

BACKGROUND

In semiconductor manufacturing, even small topological structures can impact the performance of a device. For example, in devices using magnetic materials, small topological structures can impact the magnetic properties of the device. As one example, a read head used in disc drives can be fabricated using semiconductor processing. The read head can utilize several different layers of materials in order to form a reader stack (or read sensor) in the desired configuration. A reader stack is the portion of read head that is configured to sense changes in a magnetic field. Thus, during operation, the reader stack can sense a change in the magnetic field of a magnetic medium positioned proximate to the reader stack. If a topological remnant is left behind from processing steps used to fabricate the read head, that topological remnant can potentially impact the magnetic properties of the read head depending on the size, location, and material of the topological remnant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

In accordance with certain embodiments, an apparatus includes a reader stack; a backfill layer disposed next to the reader stack; a chemical-mechanical polishing stop layer disposed above the backfill layer; and a sacrificial layer disposed on top of the chemical-mechanical-polishing stop layer.

In accordance with certain embodiments, a method can be utilized that includes depositing a backfill material layer over a reader stack; depositing a chemical-mechanical-polishing stop layer above the layer of backfill material; and depositing a sacrificial layer on top of the chemical-mechanical-polishing stop layer.

These and various other features will be apparent from the following detailed description.

BRIEF DESCRIPTION OF THE DRAWINGS

A further understanding of the nature and advantages of the present technology may be realized by reference to the figures, which are described in the remaining portion of the specification.

DETAILED DESCRIPTION

Embodiments of the present technology are disclosed herein in the context of a read head for use with a disc drive system. However, it should be understood that the technology is not limited to a read head for a disc drive system and could readily be applied to other technology systems as well.

Figure 1:
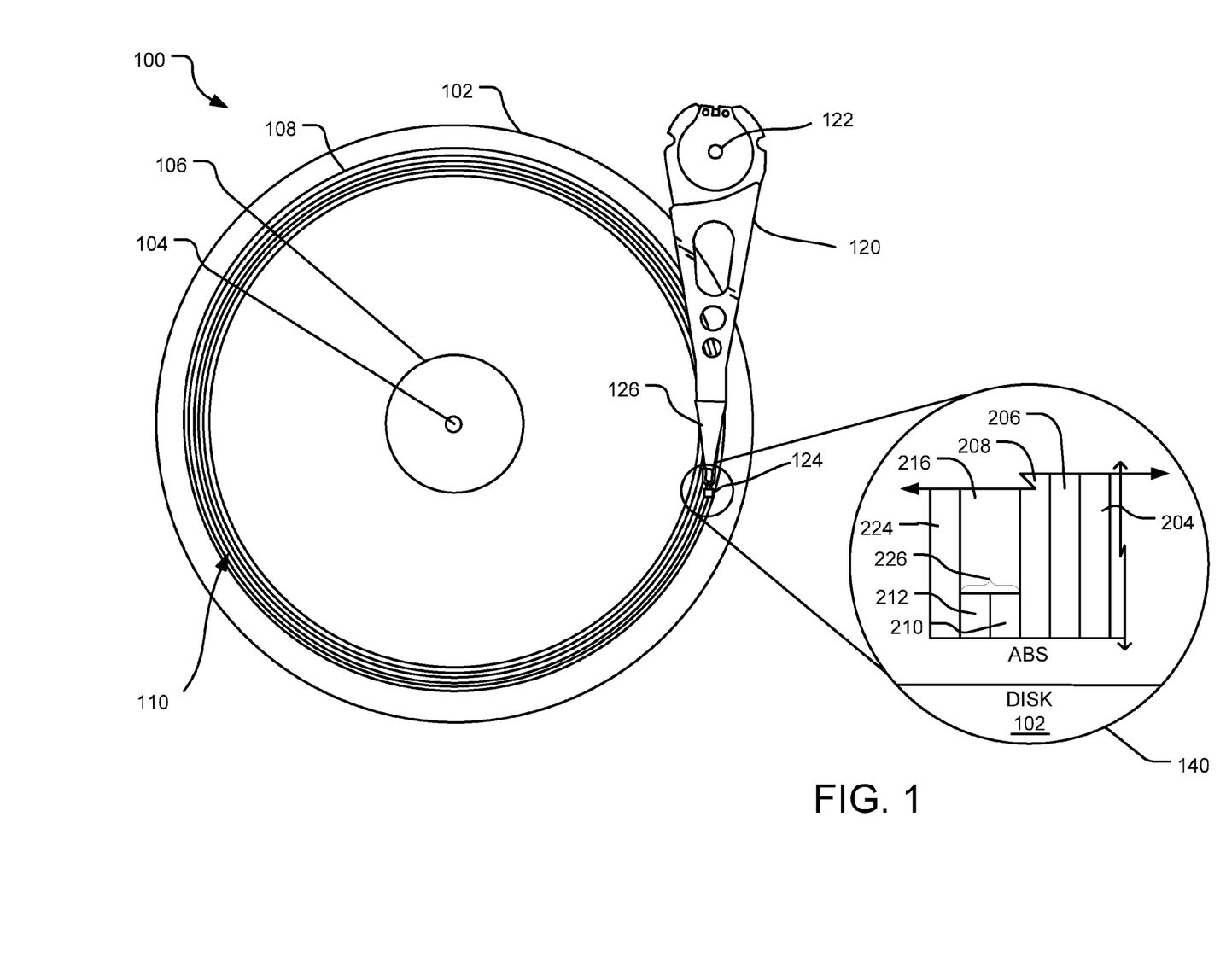
FIG. 1 illustrates an example block diagram for a disc drive system with an enlarged view of a cross-section of a long SAF read head having a substantially linear back edge, in accordance with certain embodiments.

With reference now to FIG. 1, an example of a disc drive system in accordance with one embodiment is shown. A disc drive system is but one example where the disclosed technology may be utilized. FIG. 1 illustrates a top plan view of an example disc drive system 100. A disc 102 rotates about a spindle center or a disc axis of rotation 104 during operation. The disc 102 includes an inner diameter 106 and an outer diameter 108 between which are a number of concentric data tracks 110. The data tracks 110 are substantially circular. It should be understood, however, that the described technology may be employed with other types of storage media.

Information may be written to and read from the different data tracks 110. A transducer head 124 is mounted on an actuator assembly 120 at an end distal to an actuator axis of rotation 122 and the transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

The exploded view 140 shows a cross-sectional view of a portion of a transducer head that is utilizing a long SAF read head. A read head formed with an SAF layer that is much longer than the associated free layer is referred to as a "long SAF read head." The cross-sectional view shows a shield layer 224, a cap layer 212, a free layer 210, a barrier layer 208, a long SAF layer 206, and an antiferromagnetic layer 204. A backfill layer 216 is shown above the free layer 210 and cap layer 212. Additional layers are not shown. The long SAF read head is shown with a substantially linear back edge 226. A substantially linear back edge is believed to be difficult to achieve for a long SAF read head. In accordance with certain embodiments, a process for forming a long SAF read head with a substantially linear back edge is described in further detail below.

Figure 2:
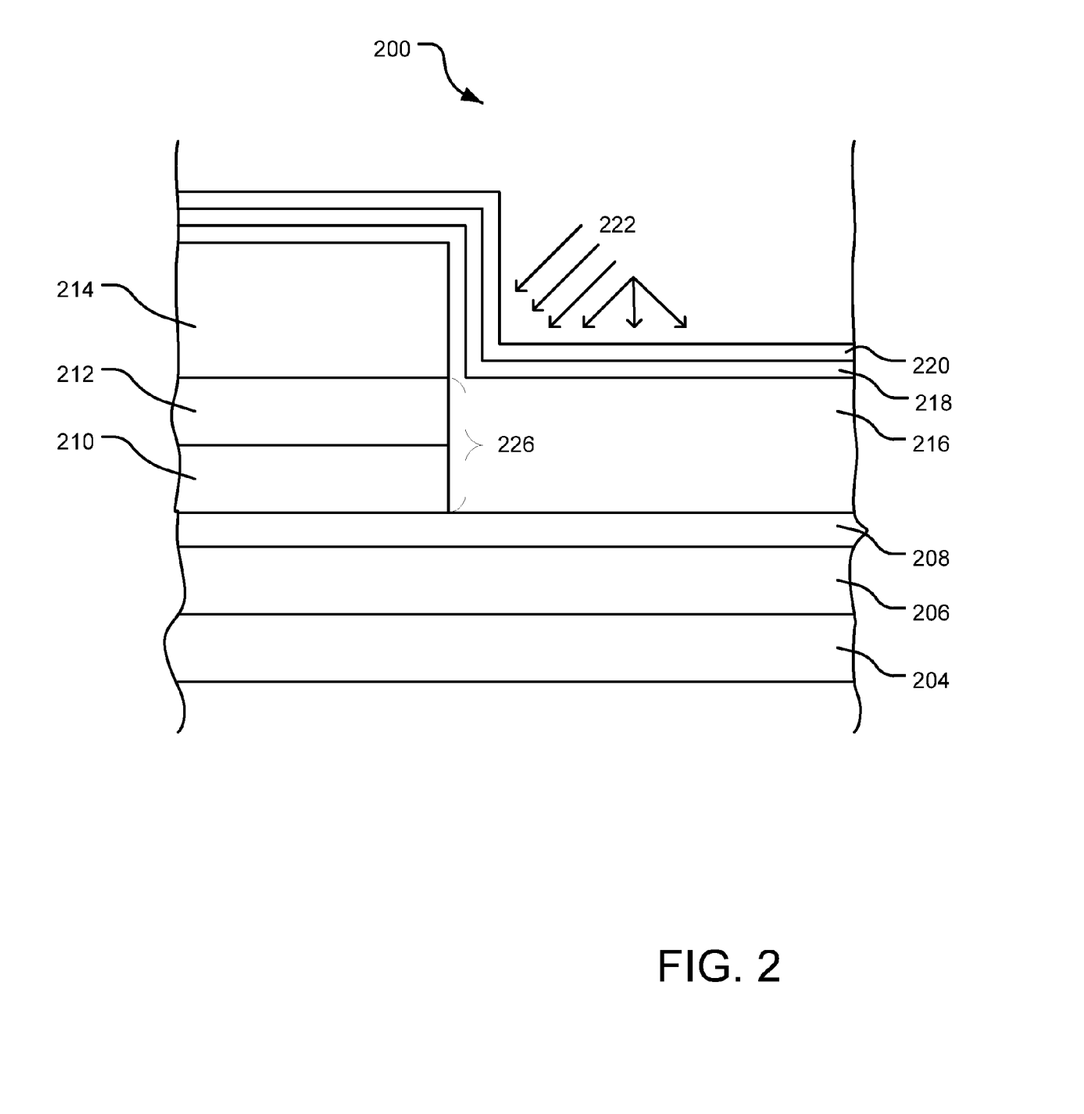
FIG. 2 illustrates a cross-sectional view of removing backfill material during processing of a long SAF read head, in accordance with certain embodiments.

Referring now to FIGS. 2-6, a process for forming a long SAF read head is disclosed in accordance with certain embodiments. FIG. 2 shows an intermediate step in the processing. While additional layers and features may also be included in the structure shown in FIG. 2, FIG. 2 shows an intermediate structure 200 that includes an antiferromagnetic (AFM) layer 204, a synthetic antiferromagnetic (SAF) layer 206, a barrier layer 208, a free layer 210, a cap layer 212, a photoresist layer 214. A backfill layer 216 is shown above a portion of the barrier layer and extends along the layers of the free layer 210, cap layer 212, and photoresist layer 214. The field deposition of the backfill layer is shown in FIG. 2 as being thicker than the sidewall deposition along the free layer 210, cap layer 212, and photoresist layer 214. A material which will be referred to herein as a chemical-mechanical-polishing stop material (sometimes referred to as a CMP-stop) is shown as layer 218. And, a layer which will be referred to herein as a sacrificial layer is shown as layer 220.

In order to remove the photoresist layer 214, the photoresist is exposed to a solution that can be used to remove the photoresist from the structure 200. FIG. 2 shows the photoresist as being covered by other layers and therefore not readily accessible to the photoresist removal solution. Therefore, in accordance with certain embodiments a "knock-off" procedure can be used to remove the material along the sidewall of the photoresist layer. This is shown in FIG. 2 by arrows 222 which are used to represent a removal operation, such as a milling operation. Because the thickness of the materials along the sidewall of the photoresist 214 is thicker than along the field of the areas, the removal operation exposes the sidewall of the photoresist layer without necessarily removing the field areas. The sacrificial layer protects the field portion of the CMP-stop material from being milled away. Thus, the full thickness of the CMP-stop material is retained for use during a subsequent CMP process.

Figure 3:
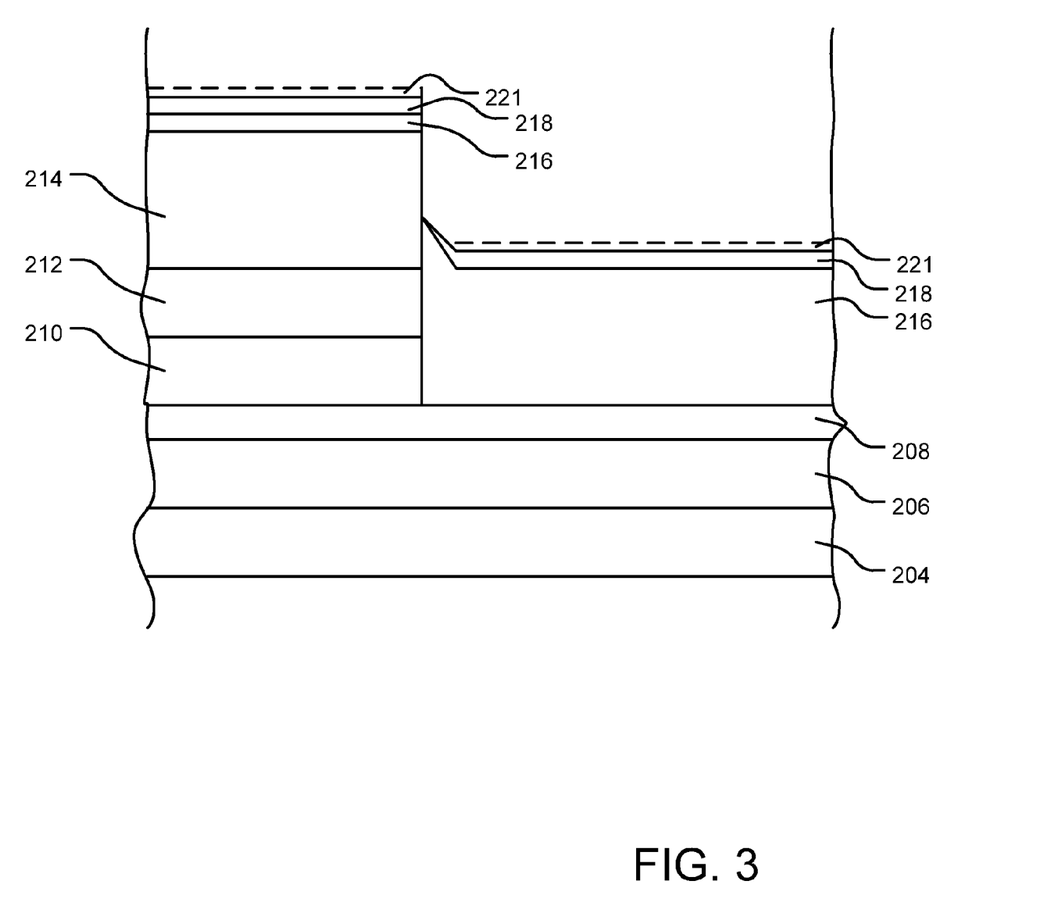
FIG. 3 illustrates a cross-sectional view during the processing of a long SAF read head wherein backfill material has been removed to expose the side of photoresist, in accordance with certain embodiments.

Thus, FIG. 3 shows a view of the intermediate structure after a milling procedure has taken place, for example. In FIG. 3, layers 204, 206, 208, 210, 212, 214, 216, and 218 are shown intact. Layer 220 has been slightly decreased in size due to the milling procedure. The modified version of layer 220 is shown as layer 221 in FIG. 3. As can be seen in FIG. 3, a "window" has been opened up in the layers that cover photoresist layer 214. This exposed area of the photoresist allows the photoresist removal solution to reach the photoresist layer during processing. The photoresist may then be easily removed.

Figure 4:
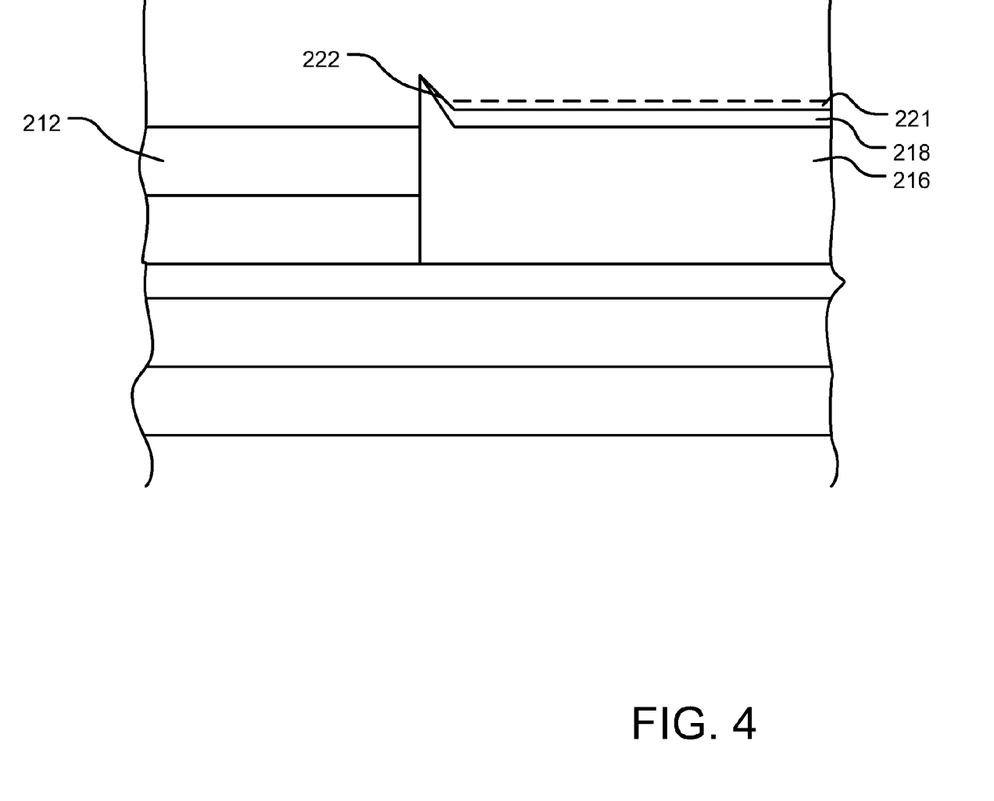
FIG. 4 illustrates a cross-sectional view during processing of a long SAF read head wherein photoresist has been removed to expose a backfill topographical remnant, in accordance with certain embodiments.

FIG. 4 shows the intermediate structure after removal of the photoresist. With the photoresist removed, a cap layer 212 is exposed. One interesting feature of this process is that a structural remnant 222 of backfill material that was not previously milled away from the sidewall of the photoresist is left in place. The backfill remnant 222 was not removed by the milling process because of the backfill remnant's position at the base of the photoresist sidewall. The milling operation could not effectively remove the remnant at the same rate that other parts of the material along the sidewall of the photoresist were removed. Structural remnants such as the backfill remnant 222 could potentially interfere with the operation of the device being fabricated. For example, a remnant might affect the magnetic properties of a device. As a result, the remnant can be removed as shown in more detail below.

FIG. 4 shows that the remnant 222 is shown adjacent a cap layer 212, a sacrificial layer 221, and a CMP-stop layer 218. In certain embodiments, a material such as alumina ($Al_2O_3$) can be used for the backfill layer 216. These different materials can have different rates of responding to a CMP process. For example, the cap layer shown in FIG. 4 can be quite hard so that it responds at a slow rate to a CMP process relative to a selected reference point or selected reference material. The backfill layer 216 (and remnant 222) can be made from a softer material such that layer 216 responds at a fast rate to a CMP process relative to a selected reference. The layer 218 which has been referred to as a CMP-stop layer can be selected to have a slow CMP rate. Thus, layer 218 has a CMP rate that is slow relative to a selected reference. And, the sacrificial layer 221 can have a fast CMP rate relative to a selected reference.

Figure 5:
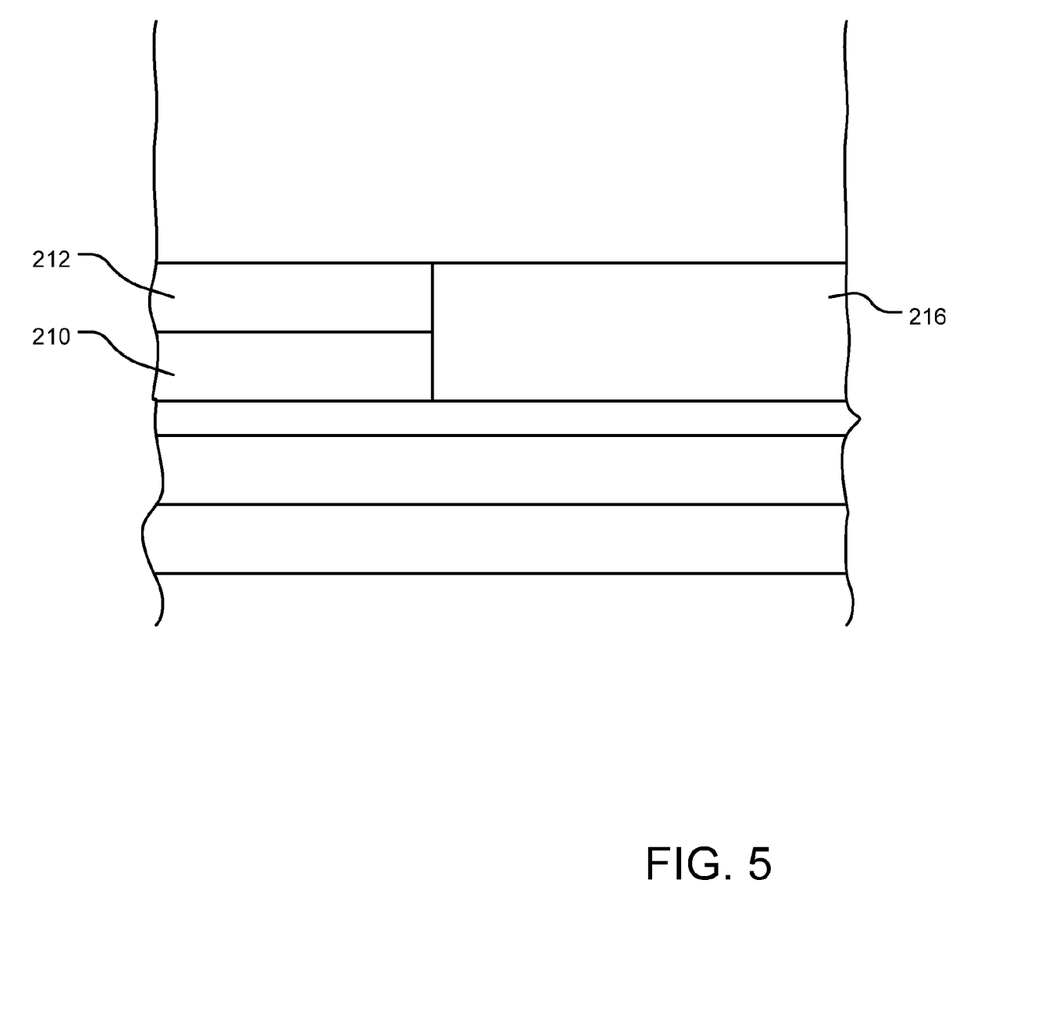
FIG. 5 illustrates a cross-sectional view during processing of a long SAF read head wherein a backfill remnant has been removed, in accordance with certain embodiments.

When a chemical-mechanical-polishing procedure is performed on the intermediate structure shown in FIG. 4, the different CMP rate materials assist in polishing away the remnant 222 while achieving an end result that is substantially planar, as shown in FIG. 5. The sacrificial material layer 221 has a fast CMP rate—so, it is removed quite quickly. Similarly, the remnant 222 is made from the backfill material—so, it is also removed quite quickly. The cap material has a slow CMP rate—so, it is not removed quickly. The CMP stop layer 218 has a slow CMP rate—so, it is also not removed quickly. The CMP stop layer 218 protects the field area of the backfill layer 216, since the backfill layer has a high CMP rate. As a result, CMP process can remove the remnant feature 222 quickly while the cap layer 212 and CMP stop layer are more slowly reduced. The thickness of the CMP stop layer and sacrificial layer can be selected so that the CMP process exposes the field portion of the backfill layer 216 at the same time that the remnant 222 has been polished down to the field level of the backfill layer. For example, a CMP stop layer thickness of about 1.0-5.0 nm could be utilized in one example. CMP stop materials can include, for example, Ir, Pt, Mo, Ti, W, and Ru, among others. And, a sacrificial layer thickness of about 1.0-5.0 nm could be used. Sacrificial materials can include for example Ni, NiFe, and Ta, among others.

FIG. 5 shows an example of an intermediate structure after a CMP process has been performed. The cap layer 212 and the backfill layer 216 are shown in substantial alignment with one another. Also, the edge formed by the back portion of cap layer 212 and free layer 210 and backfill layer 216 is substantially linear. A substantially linear edge for long SAF readers, for example, is believed to be difficult to achieve. The process described by using the process shown in FIGS. 2-6 allows such a substantially linear edge for a long SAF reader to be achieved.

Figure 6:
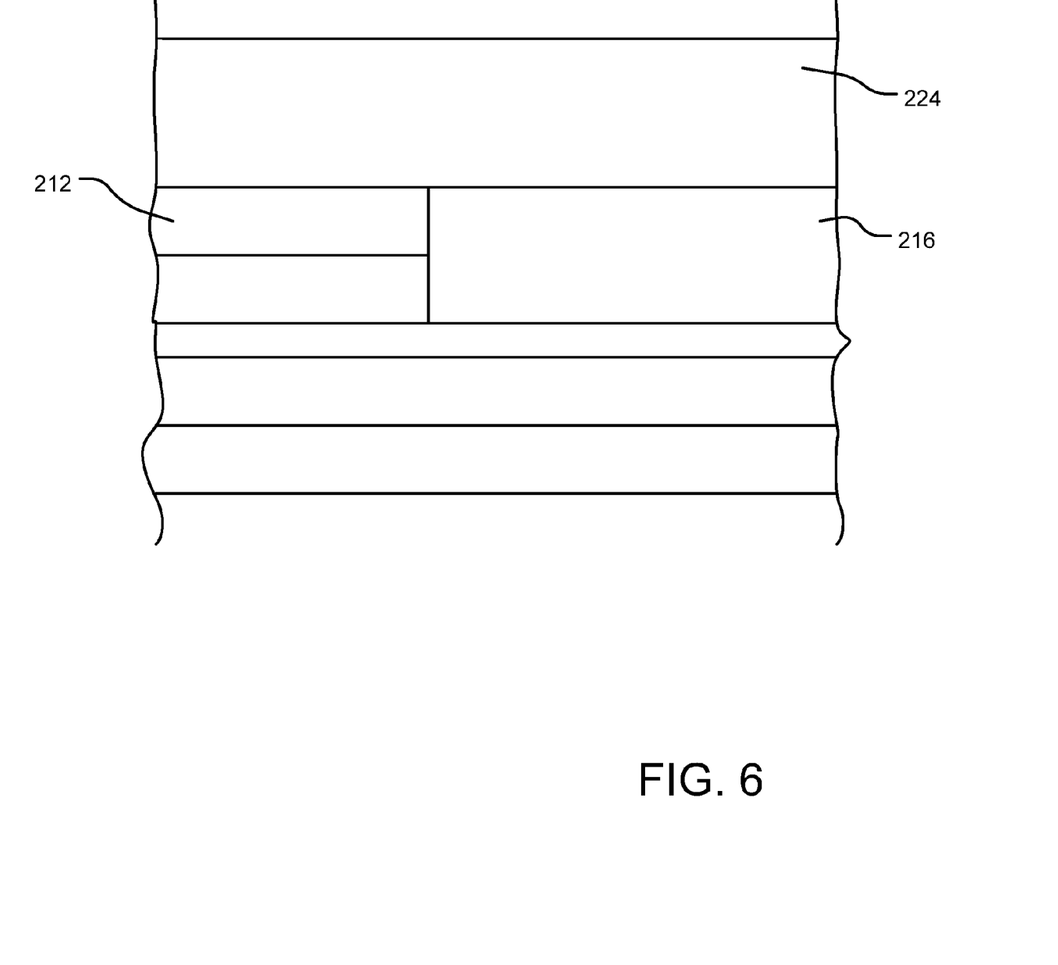
FIG. 6 illustrates a cross-sectional view during processing of a long SAF read head wherein a shield layer has been formed over the substantially planar backfill layer, in accordance with certain embodiments.

Referring now to FIG. 6, a shield layer 224 is shown deposited over cap layer 212 and backfill layer 216. The cap layer and backfill layer are shown forming a substantially linear edge with the previous remnant removed.

Figure 7:
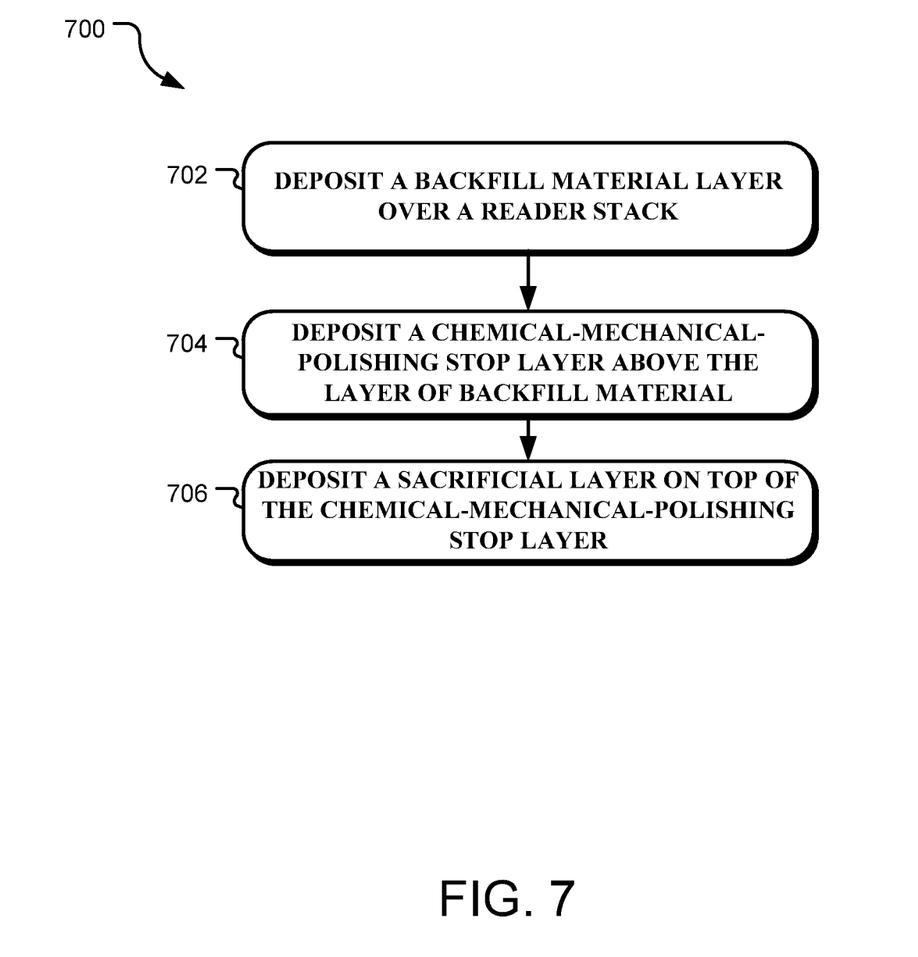
FIG. 7 illustrates a flow chart that shows a method of preparing an intermediate structure for chemical-mechanical-polishing in accordance with certain embodiments.

FIG. 7 illustrates a flow chart of an example of a process 700 for preparing an intermediate structure for chemical-mechanical-polishing in accordance with certain embodiments. In operation 702 of FIG. 7, a layer of backfill material is deposited over a reader stack. A chemical-mechanical-polishing stop layer is deposited above the layer of backfill material in operation block 704. In operation block 706, a sacrificial layer is deposited on top of the chemical-mechanical-polishing stop layer.

Figure 8:
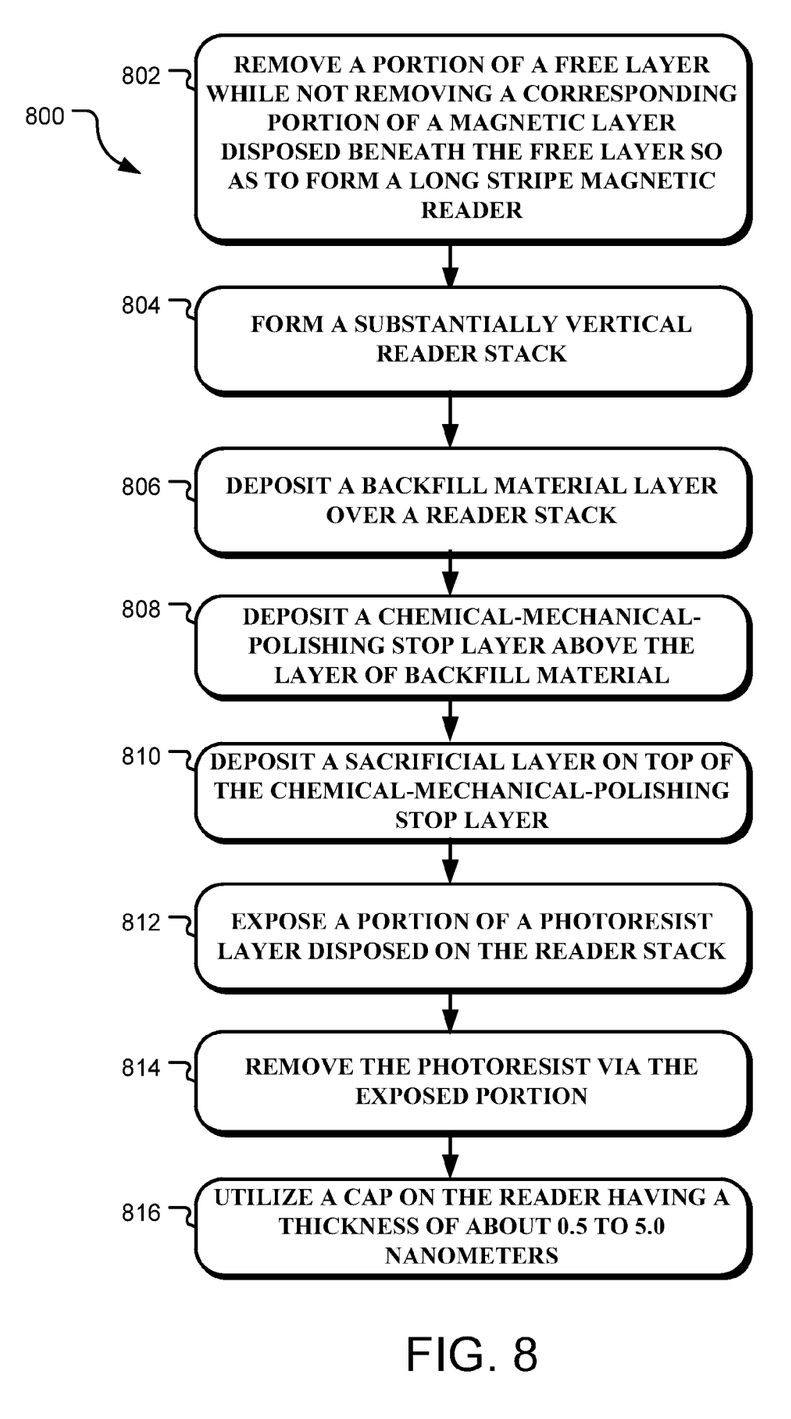
FIG. 8 illustrates yet another flow chart that shows a method of preparing an intermediate structure for chemical-mechanical-polishing in accordance with certain embodiments.

FIG. 8 illustrates yet another example process via flow chart 800. In block 802, an intermediate structure to be operated on is provided. A magnetic layer such as an SAF layer is disposed in proximity to the free layer. A portion of the free layer of the intermediate structure is removed while a corresponding portion of the SAF magnetic layer in proximity to the magnetic layer is not removed. This forms what is referred to as a long SAF read head because the SAF layer is substantially longer than the free layer.

Operation block 804 notes that the process allows a substantially linear back edge to be formed by the reader stack. For example, FIG. 2 shows substantially linear back edge 226. This substantially linear back edge is sometimes used to refer to the reader stack as being substantially vertical.

In operation block 806, a backfill material is deposited over a reader stack. For example, $Al_2O_3$ can be utilized as the backfill material. Other backfill materials may be utilized as well. A chemical-mechanical-polishing stop layer is deposited above the layer of backfill material in accordance with operation block 808. The CMP-stop layer is selected to have a CMP rate that is slower than the CMP rate of the backfill material. In addition, a sacrificial layer is deposited on top of the CMP-stop layer, as shown by block 810. The material used for the sacrificial layer can be selected to have a CMP rate that is faster than the CMP rate of the CMP-stop layer, for example.

In operation block 812, a portion of the photoresist layer that is disposed on the reader stack is exposed. For example, a portion of the material along the sidewall of the photoresist may be removed by a milling operation. Once the photoresist is exposed, the photoresist is removed, as shown by operation block 814. Operation block 816 shows that a cap on the reader can have a thickness of approximately 0.5 to 5.0 nanometers, depending on the desired design.

The processes and structures described above can be beneficial for different reasons. For example, the process described herein allows a long SAF reader to be formed. Moreover, in accordance with certain embodiments, a long SAF reader with a substantially vertical back edge can be formed. Another way to state this is that the back edge of the read stack and the backfill layer can form an angle of approximately 90 degrees.

In certain embodiments, a thin cap layer over a reader stack may be formed. The thin cap layer can be formed consistently from wafer to wafer by the process described herein because the CMP process can be controlled. The "knock-off" process described herein allows a thin cap layer to be used over the reader stack while a thin cap has been more difficult to implement with a process often referred to as a photoresist "lift-off" process.

It is noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

It is thought that the apparatuses and methods of embodiments described herein will be understood from this specification. While the above description is a complete description of specific embodiments, the above description should not be taken as limiting the scope of the patent as defined by the claims.

What is claimed is:

1. A method comprising:
   depositing a backfill material layer over a reader stack;
   after depositing the backfill material, depositing a chemical-mechanical-polishing stop layer above the layer of backfill material; and
   after depositing the chemical-mechanical-polishing stop layer, depositing a sacrificial layer on top of the chemical-mechanical-polishing stop layer.

2. The method as claimed in claim 1 and further comprising:
   exposing a portion of a photoresist layer disposed on the reader stack.

3. The method as claimed in claim 2 and further comprising:
   removing the photoresist via the exposed portion.

4. The method as claimed in claim 2 wherein exposing the portion of the photoresist layer comprises:
   milling through the sacrificial layer, the chemical-mechanical-polishing stop layer, and the backfill layer.

5. The method as claimed in claim 1 and further comprising:
   forming a substantially vertical reader stack.

6. The method as claimed in claim 1 and further comprising:
   removing a portion of a free layer while not removing a corresponding portion of a magnetic layer disposed beneath the free layer so as to form a long stripe magnetic reader.

7. The method as claimed in claim 1 and further comprising:
   utilizing $Al_2O_3$ as the backfill layer.

8. The method as claimed in claim 1 and further comprising:
   forming a cap on the reader having a thickness between about 0.5 nm and about 5.0 nm.

9. The method as claimed in claim 1 wherein the sacrificial layer has a first CMP rate and the chemical-mechanical-polishing stop layer has a second CMP rate and wherein the first CMP rate is greater than the second CMP rate.

10. The method as claimed in claim 9 wherein the backfill layer has a third CMP rate and wherein the third CMP rate is greater than the second CMP rate.

11. An apparatus comprising:
    a reader stack;
    a backfill layer next to and above the reader stack;
    a chemical-mechanical polishing stop layer on top of the backfill layer; and
    a sacrificial layer on top of the chemical-mechanical-polishing stop layer.

12. The apparatus as claimed in claim 11 and further comprising:
    a photoresist layer disposed on top of the reader stack; and
    wherein the backfill layer covers the photoresist layer.

13. The apparatus as claimed in claim 12 and further comprising:
    an opening formed in the backfill layer so as to expose the photoresist layer.

14. The apparatus as claimed in claim 13 wherein the opening is an opening formed by milling.

15. The apparatus as claimed in claim 11 wherein the reader stack comprises substantially vertical sidewalls.

16. The apparatus as claimed in claim 11 and further comprising:
    a freelayer;
    a magnetic layer disposed beneath the free layer and having a length longer than the length of the free layer.

17. The apparatus as claimed in claim 11 wherein the backfill layer comprises $Al_2O_3$.

18. The apparatus as claimed in claim 11 and further comprising:
    a cap layer on the reader stack comprising a thickness between about 0.5 nm and about 5.0 nm.

19. The apparatus as claimed in claim 11 wherein the sacrificial layer has a first CMP rate and the chemical-mechanical-polishing stop layer has a second CMP rate and wherein the first CMP rate is greater than the second CMP rate.

20. The apparatus as claimed in claim 19 wherein the backfill layer has a third CMP rate and wherein the third CMP rate is greater than the second CMP rate.

* * * * *